United States Patent [19]

Irwin

[11] Patent Number: 5,878,694
[45] Date of Patent: Mar. 9, 1999

[54] WALL HANGING MEANS

[76] Inventor: Russell S. Irwin, 513 Venneman Ave., St. Louis, Mo. 63122

[21] Appl. No.: 888,247

[22] Filed: Jul. 7, 1997

[51] Int. Cl.$^6$ .............................. A01K 1/03; A01K 63/00
[52] U.S. Cl. ........................... 119/452; 119/257; 119/246
[58] Field of Search ................................ 119/207, 245, 119/246, 247, 257, 452; 47/69; 248/200, 251; 160/182

[56] References Cited

U.S. PATENT DOCUMENTS

| | | | |
|---|---|---|---|
| 3,874,336 | 4/1975 | Murphy | 119/257 |
| 4,662,596 | 5/1987 | Haarer | 248/251 |
| 4,967,694 | 11/1990 | Waldman | 119/246 |
| 5,090,358 | 2/1992 | Waldman | 119/257 |
| 5,404,839 | 4/1995 | Mancuso | 119/246 |
| 5,435,270 | 7/1995 | Newman | 119/257 |
| 5,713,304 | 2/1998 | De Vosjoli et al. | 119/452 |

*Primary Examiner*—Michael J. Carone
*Assistant Examiner*—Elizabeth Shaw

[57] ABSTRACT

Recently it has been found that terrariums which house plants make interesting wall hangings. Animal terrariums make even more interesting wall hangings. In utilizing terrariums as wall-mounted terrariums there is the possibility of their being knocked off of the wall, particularly terrariums housing animals. These must be larger and more sturdily constructed, and are heavier. There is, then, a need for a hanging means which securely supports a terrarium on a wall. This invention provides such a hanger. The hanging means includes a hanging bracket adapted for attachment to the back of the wall hanging, and a supporting bracket adapted for attachment to a wall.

10 Claims, 2 Drawing Sheets

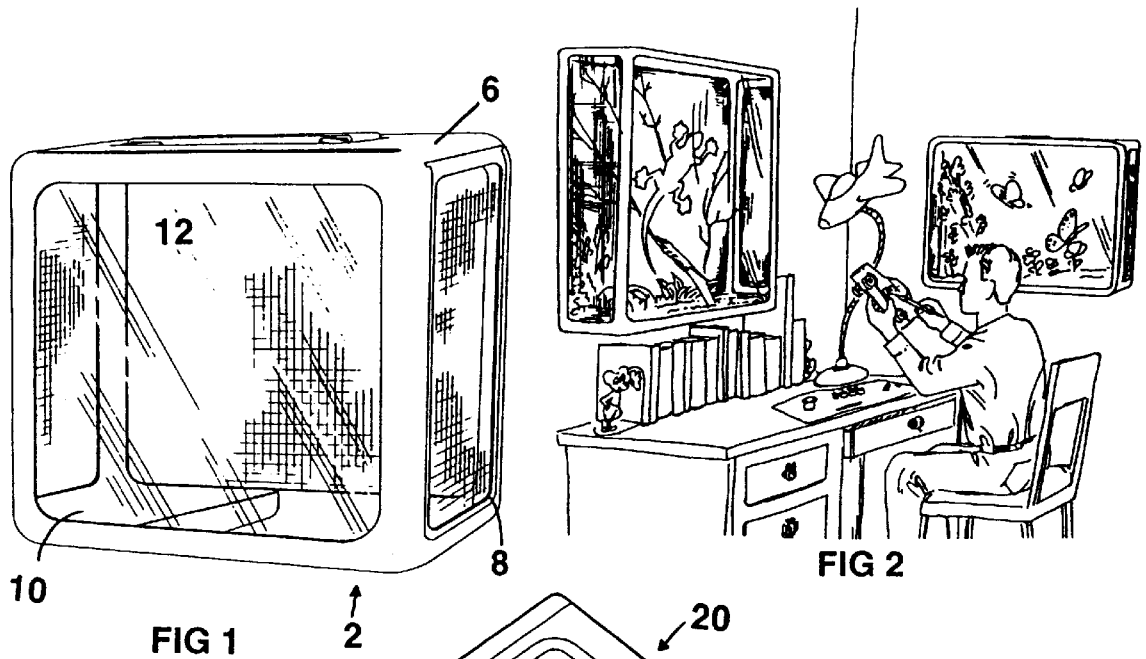
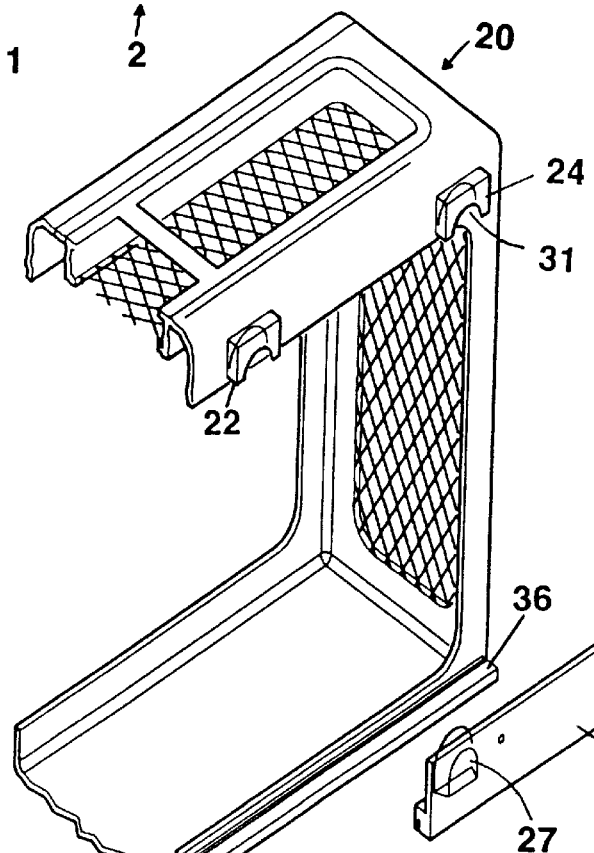
FIG 1
FIG 2
FIG 3

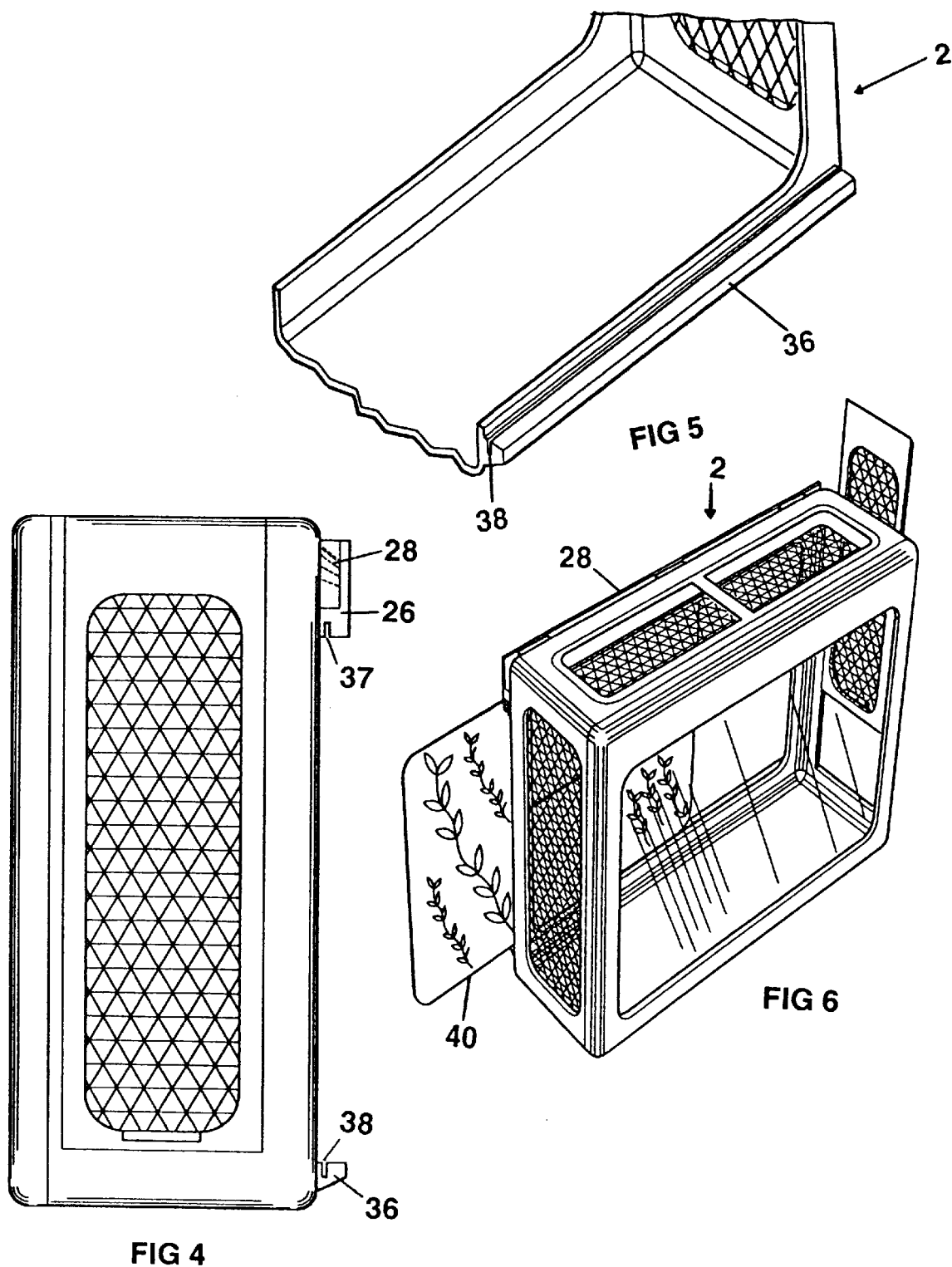

WALL HANGING MEANS

RELATED APPLICATIONS

This invention is an improvement of my copending vivarium application Ser. No. 08/697,071, filed: Aug. 19, 1996, now abandoned.

FIELD OF THE INVENTION

This invention, in one of its aspects, relates to means for attaching wall hangings to walls. In another aspect the invention pertains to support means for hanging terrariums and vivariums. In still another aspect of its aspects the invention provides a means for securing display cases to walls.

BACKGROUND OF THE INVENTION

Terrariums have been defined as glass, wood, or plastic enclosures in which small plants are grown. Terrariums have been termed vivariums when they house small living creatures in an environment as close as possible in soil, vegetation and the like to the creatures' natural habitats. It is both of these vivariums and terrariums, to which this invention pertains. In fact, in another of its definitions a terrarium has been described as an enclosure in which small land animals, including insects, are kept alive. It is that definition which will be used herein. The term terrarium, then, will be employed herein to mean both terrariums and vivariums.

Recently it has been discovered that terrariums which house plants only make interesting wall hangings, in many instances replacing pictures. Such terrariums are described in U.S. Pat. No. 4,967,694 and U.S. Pat. No. 5,090,358, and, to add interest, pictures have been inserted behind the plants to provide a more appealing wall hanging. Such terrarium background pictures can range from photographs to paintings, and usually will be outdoor scenes.

As explained in my copending patent application Ser. No. 08/697,071 I have found that animal terrariums make even better wall hangings or mounts. Watching living creatures moving about during their daily activities is more interesting than observing static plants with a picture behind them. By the provision of such a vivaruim it is possible to watch such creatures as chameleons, baby turtles, snakes, salamanders, frogs, toads, and lizards eat, play, and grow. In addition to these small animals, butterflies, ladybugs, spiders, praying mantis, and other insects will also attract attention. Terrariums housing such small creatures are especially appealing to children, and they are educational as well.

One of the problems encountered in utilizing terrariums as wall-mounted terrariums is the possibility of their being knocked off of the wall, particularly since children are attracted to them. Terrariums housing animals must be larger and more sturdily constructed in order to provide circulation and climbing space for the animals living in them, and to include provisions for accessibility by the animal's keeper. They are also be heavier because they house the elements making up the animal's habitat. And it is still desirable to include a background picture.

Having provided an attractive terrarium, it is quite clear that there is a need for a hanging means securely supporting the terrarium on a wall, especially where it might be handled, and possibly knocked down, by children. This invention provides a hanger for such terrariums, as well as for cases housing expensive momentos. The hanger also prohibits removing the hangings from the wall without releasing a locking means.

SUMMARY OF THE INVENTION

To make it difficult to remove a wall hanging from a wall a hanger is provided which includes a hanging bracket, and a supporting bracket. The hanging bracket is adapted for attachment to the back of the wall hanging, that is, the terrarium. The supporting bracket is adapted for attachment to a wall. The hanging bracket has a plurality of contoured recesses cut in it. The supporting bracket has an equal number of lobes formed on it. One lobe is contoured to fit in each recess in the hanging bracket so that the hanging bracket can be hung on the supporting bracket. Since the hanging bracket is attached to the wall hanging, and the supporting bracket is attached to the wall, the wall hanging will be supported on the wall by placing the recesses in the hanging bracket over the lobes of the supporting bracket.

As indicated means for locking the wall hanging in place are also provided. This wall hanging locking means includes a downwardly directed longitudinal slot and a corresponding upwardly directed longitudinal slot. The downwardly directed longitudinal slot is disposed across the bottom of the supporting bracket, and it is capable of receiving a panel. The upwardly directed longitudinal slot is disposed across a locking bar. The locking bar is adapted for attachment to the back of the wall hanging, and it will be attached so that it is spaced below the hanging bracket. The slot in the locking bar, a lower slot, will then be parallel to the slot in the hanging bracket, an upper slot. A panel, sized to fit slideably in both the upper and lower slots, will be inserted in the slots to prevent the wall hanging from being lifted off the bracket. The locking bar also serves as a stabilizer to ensure that the terrarium hangs straight and parallel to the wall. Its width is equal to that required by the locking means above it so that in hanging straight it is more stable and also more visually appealing.

DESCRIPTION OF THE DRAWINGS

For a more complete understanding of the invention it will now be described in conjunction with accompanying drawings. In these drawings, FIG. 1 is a perspective view illustrating the configuration or shape of a preferred terrarium of the invention described in detail in my copending patent application.

FIG. 2 is an illustration showing two terrariums of the invention as they appear on a wall of a room.

FIG. 3 is a partial view, in perspective, showing a terrarium's wall mounting means of this invention.

FIG. 4 is an end view showing both the hanging means and the locking means as they would be employed in conjunction with both pictures and terrariums.

FIG. 5 is a partial view, also in perspective, showing the locking bar of the invention.

FIG. 6 is a perspective view showing the use of a panel as a lock, preventing removal of the terrarium from its hanger.

DETAILED DESCRIPTION OF THE INVENTION

Referring now to the drawings, one type of vivarium or terrarium with which this invention is concerned is illustrated in FIG. 1. Terrarium 2, as can be seen, is fabricated so that it has a bottom or floor 4, a top panel 6, side panels 8, front panel 10 and a back panel 12. As can be seen, each panel has four other panels attached to it, one to each of its four edges. Thus, front panel 10 has top panel 6 along its top edge, side panels 8 along each side edge, and bottom panel 4 attached along its bottom edge. If these walls were squares the structure would be a cube. Since the walls are rectangular rather than square, the terrarium is a parallelepiped, an elongated cube. In actual fabrication these edges are a framework for glass, clear plastic or screen panels. As is readily apparent in FIG. 1, screens are in the sides and top, and clear plastic or glass panels are in the front and back. Whereas a suitcase-shaped terrarium is desirable, a high, narrow, terrarium is preferred so that the creatures living in it have room to roam and play. For terrariums, then, the top, bottom and side rectangular panels will be long and narrow, yielding a terrarium which is narrow from front to back, but sufficiently high to allow for plant growth and creature maneuvering.

When soil, plants, rocks, and food, are incorporated in the terrariums they will appear as they do in FIG. 2. It is in this form that the terrariums serve as interesting wall mounts. People, especially children, enjoy watching the little animals or insects, the creatures, moving about and eating.

One of the disadvantages of using terrariums as wall mounts is that care must be exercised, especially with children observing them, not to knock the hangings off of the wall. This is especially easy to do when the terrarium doors are being opened to feed the animals or water the plants. The invention herein is concerned with means for locking the terrariums, or other hangings such as cases in which expensive coins, medals, heirlooms, guns and the like are hung on walls for display purposes. The means includes a hanging bracket, a supporting bracket, and a locking bar. These are illustrated in FIG. 3. Desirably, the hanging bracket can be one or more block shaped socket components 22 or 24, each having a downwardly facing cavity cut therein defining the sockets illustrated in FIG. 3. A plurality, say three or four, of these components can be spaced along the top back surface of the terrarium 20. The supporting bracket generally will be a support bar 26 provided with lobes 27 and 28 as stud components adapted to fit in the contoured recesses constituting the hanging bracket. The locking bar 36 illustrated in FIG. 3 will be described hereinafter.

Referring now to the mode of hanging the terrarium, from FIG. 3 it can be imagined that if support bar 26 is attached to a wall of a room, the terrarium 2 can be placed over it with the cavities in socket components 22 and 24 fitting over lobes 27 and 28. This can be seen in the end view illustrated in FIG. 4 which shows a lobe 28 seated in cavity or shallow recess 31 (FIG. 3). For locking purposes to be described the lobes and sockets will be tapered downwardly as shown in FIG. 3. In other words, rather than lobes having top portions perpendicular to the wall they have upwardly directed portions clearly visible at v in FIG. 3. In order to remove the terrarium from the hanging bar, from the lobes, then, it must be lifted upwardly rather than merely outwardly. This not only renders it more difficult to remove the terrarium from the hanger, but it also affords the basis for the locking mechanism which will now be described.

As touched on hereinbefore a locking bar is a part of this invention. This bar is shown as 36 in FIG. 3, and as an enlargement in FIG. 5. By referring to FIG. 5 it can be seen that the locking bar is secured to the lower portion of terrarium 2, and that it is provided with a longitudinal groove 38 throughout its entire length. As can be seen in FIG. 4 locking bar 36 is installed below support bar 26. Support bar 26 is also provided with a longitudinal groove visible in FIG. 3, but shown clearly as 37 in FIG. 4. Groove 37 also extends all the way across the support bar. Again examining FIG. 4, it is to be appreciated that support bar 26 and locking bar 36 are so disposed that the grooves 37 and 38 are virtually parallel to each other. This permits a panel 40 (FIG. 6) to be utilized as a locking device. As previously suggested in my summary, to lock the terrarium in place a panel sized to fit slideably in both the upper groove 37 and the lower groove 38 is inserted in those slots. Since lobes 27 and 28 and cavities or recesses 31 are tapered to prevent the wall hanging from being lifted off the bracket unless it is lifted upwardly panel 40 functions as a lock. When panel 40 is slid into both upper and lower grooves 37 and 38 (FIG. 4) it can be slipped behind the terrarium as illustrated in FIG. 6. If the terrarium is lifted upwardly, locking bar 36 will tend to push the panel upwardly against support bar 26., (FIG. 4). Since support bar 26 is secured to a wall, the panel prevents the terrarium from being lifted off of the lobes. The strength of the lock then will depend on the strengths of the support and locking bars and upon the material the panel is made of.

It has been stated that to add interest it is desirable to place pictures behind the terrarium. This invention, then, not only includes a provision for such a picture, but utilizes the picture as the lock for the terrarium. The picture can be painted on, or affixed to, the locking panel 40 as shown in FIG. 6. Panel 40 thus functions not only as a background picture, but as a part of the lock.

It can be seen that an effective locking means for terrariums and the like is therefore provided herein. One of the advantages of the invention is that in addition to functioning as part of a lock, locking bar 38 also functions as a space holder. The locking bar holds the bottom of the terrarium out away from the wall a distance equal to the distance the hanging and support bars hold the terrarium away from the wall. In other words, the use of the locking bar allows the terrarium or other hanging to be suspended parallel to the wall because the locking bar compensates for the space utilized by the hanging means above it.

Having been given the teachings of this invention, ramifications and variations of it will occur to those skilled in the art. Thus, the terrarium and hanging and locking means can be made of wood, metal or plastic. As another example, even though several block shaped hanging components such as 22 and 24 have been described, one such block component can be used in the center of the terrarium. It will also be appreciated that some people like to display their coin, stamp, or gun collections. If the wall hanging is a display case for such a collection the lock bar can be designed accordingly. As an example a strong panel, perhaps velvet covered, can be inserted in the groove in the locking bar where the picture would normally be. In addition means such as paddle locks and the like can be used to lock the panel in place. If the lock cannot be readily removed it will be even more difficult to lift the display case off of the wall. It can be seen, too, that if the lobes and the sockets are inverted the lobes can be attached to the terrarium and the recessed blocks can be attached to the wall. In this instance it will be desirable to affix the recessed blocks to a bar, a supporting bar. The lobes can then be on a banging bar, or separately affixed to the top back of the terrarium.

What is claimed is:

1. A hanger for wall hangings including (1) a hanging bracket, (2) a supporting bracket, the hanging bracket being adapted for attachment to the back of the wall hanging, the supporting bracket being adapted for attachment to a wall, the hanging bracket having a plurality of contoured recesses therein, the supporting bracket having an equal number of lobes thereon, one lobe being contoured to fit in each recess in the hanging bracket so that the hanging bracket can be hung on the supporting bracket to support a wall hanging attached thereto, and (3) wall hanging locking means including a downwardly directed longitudinal slot across the bottom of the supporting bracket capable of receiving a panel therein, a locking bar having an upwardly directed longitudinal slot thereacross, the locking bar being adapted for attachment to the back of the wall hanging and spaced below the hanging bracket so that the slot in the locking bar, a lower slot, is parallel to the slot in the hanging bracket, an upper slot, and a panel sized to fit slideably in both the upper and lower slots to prevent the wall hanging from being lifted off the bracket.

2. The hanger of claim 1 wherein the hanging bracket is in the form of a bar, a hanging bar, having a plurality of contoured recesses therein, and wherein the supporting bracket is in the form of a bar, a supporting bar, having an equal number of lobes projecting therefrom, each contoured to fit in a recess in the hanging bar.

3. The hanger of claim 2 wherein the wall hanging is a terrarium.

4. The hanger of claim 3 wherein the wall hanging is fabricated of wood.

5. The hanger of claim 4 wherein the panel is a picture visible through the terrarium.

6. The hanger of claim 1 wherein the recesses in the hanging bracket are inclined downwardly away from a wall hanging when the bracket is attached to a hanging, and the lobes of the supporting bracket are inclined upwardly away from the wall when the bracket is attached to a wall.

7. The hanger of claim 1 wherein the wall hanging is a vivarium.

8. The hanger of claim 1 wherein the wall hanging is a terrarium.

9. The hanger of claim 8 wherein the terrarium is fabricated of plastic.

10. The hanger of claim 9 wherein the panel is a picture visible through the terrarium.

\* \* \* \* \*